(12) United States Patent
Hu

(10) Patent No.: US 10,141,740 B2
(45) Date of Patent: Nov. 27, 2018

(54) AUXILIARY SUPPLY GENERATION FOR POWER CONVERTERS

(71) Applicant: Cree, Inc., Durham, NC (US)

(72) Inventor: Qingcong Hu, Morrisville, NC (US)

(73) Assignee: Cree, Inc., Durham, NC (US)

( * ) Notice: Subject to any disclaimer, the term of this patent is extended or adjusted under 35 U.S.C. 154(b) by 127 days.

(21) Appl. No.: 15/189,610

(22) Filed: Jun. 22, 2016

(65) Prior Publication Data
US 2017/0373496 A1    Dec. 28, 2017

(51) Int. Cl.
*H02J 1/00* (2006.01)
*H02M 3/335* (2006.01)
*H02M 1/00* (2006.01)

(52) U.S. Cl.
CPC ........... *H02J 1/00* (2013.01); *H02M 3/33561* (2013.01); *H02M 2001/008* (2013.01)

(58) Field of Classification Search
CPC ............... H02J 1/00; G05F 1/46; G05F 1/577
See application file for complete search history.

(56) References Cited

U.S. PATENT DOCUMENTS

2012/0286576 A1\* 11/2012 Jing ..................... H02M 3/156
                                                                307/43

\* cited by examiner

*Primary Examiner* — Robert Deberadinis
(74) *Attorney, Agent, or Firm* — Brinks Gilson & Lione

(57) ABSTRACT

A power converter may be configured to power multiple output loads, including a main output load and at least one auxiliary output load. The power converter may include control circuitry that controls power delivery to output circuits coupled to the output loads. When the main output load is operating in a reduced power mode, the control circuitry may trigger the switching circuitry to increase the supply of power in order to increase the auxiliary voltages used to power the auxiliary loads if one or more of the auxiliary voltages drops below a threshold due to the main output load operating in the reduced power mode.

25 Claims, 7 Drawing Sheets

AUXILIARY SUPPLY GENERATION FOR POWER CONVERTERS

BACKGROUND

As lighting products become more and more intelligent, various auxiliary circuits, such as sensors, radio frequency (RF) communication modules, or other accessory circuits may be added to the product. These auxiliary circuits require auxiliary bias supplies from driver circuits. As power consumption of the auxiliary circuits becomes considerable, the bias supplies should be generated with adequate efficiency and should remain stable even if the main output source or load of the lighting product is off.

An additional, standalone power converter that is independent from the main power converter used to drive the main output load can be used to generate the auxiliary bias supplies. However, such an additional converter increases the cost and size of the lighting product. Alternatively, the main converter used to drive the main output source can include an additional stage of power conversion in order to drive the auxiliary circuits. However, such an approach may provide relatively low power efficiency, especially if the voltage across the main output load is significantly higher than the voltage across the auxiliary load.

A third approach for generating the auxiliary bias supplies is to use voltage generated across secondary windings of a magnetic element, such as a transformer, of the main power converter. For some applications, in situations when the main output load is in a reduced or low power consumption mode (e.g., when the main light emitting diodes (LEDs) of the lighting product are in a dimmed or off state), it may still be desirable for the auxiliary circuits to be functioning in a normal operation mode, in which case a sufficient amount of energy needs to be supplied to the secondary windings to maintain the auxiliary bias voltage at a sufficiently high level. When the main output load is in the reduced or lower power consumption mode, it may consume no or a relatively small amount of current such that the bias voltage used to power the main output load stays relatively high. Power converters that monitor the output voltage of the main output load through feedback in order to control the supply of power may detect that the main output voltage is staying at a relatively high level and, in turn, determine to decrease the amount of power supplied from the magnetic element. However, this decrease in the amount of supplied power from the magnetic element may cause the auxiliary bias voltage to drop, causing the auxiliary circuits to undesirably stop operating. As such, ways to keep the auxiliary circuits operating while the main output load is in a reduced power consumption mode and while still utilizing the secondary windings of the magnetic element of the main converter may be desirable.

BRIEF SUMMARY

The present description describes power converters and related methods in which feedback control circuitry is configured to cause an increase in a level of a voltage used to power auxiliary output circuitry when the level falls below a threshold level. The present description also describes power converters and related methods of using an input voltage instead of an output voltage of a converter of the auxiliary output circuitry to control or regulate the level of the voltage. In one embodiment, a power converter includes: a first output circuit configured to generate a first voltage to power a first output load; a second output circuit configured to generate a second voltage to power a second output load; and a control circuit. The control circuit is configured to: control power supplied from a magnetic element of the power converter to the first and second output circuits; and trigger an increase in the supply of power in response to a level of the second voltage falling below a threshold level.

In some embodiments, the control circuit is further configured to monitor the first voltage, and control regulation of the first voltage based on the monitoring without being affected by changes in the level of the second voltage when the level of the second voltage is above the second threshold level.

In some embodiments, the control circuit is further configured to change a level of current supplied to an optocoupler in response to the level of the second voltage falling below the threshold level, wherein the change in the level of current triggers the increase in the supply of power.

In some embodiments, the control circuit includes a comparator circuit configured to generate a comparator output voltage at a level to cause the change in the level of the current when the level of the second voltage falls below the threshold level.

In some embodiments, the control circuit includes a transistor coupled to the optocoupler, and the transistor is configured to supply the current to the optocoupler and change the level of the current when the second voltage falls below the threshold level.

In some embodiments, the transistor includes a first terminal coupled to the second voltage, a second terminal coupled to a Zener diode; and a third terminal coupled to the optocoupler.

In some embodiments, the control circuit comprises a Zener diode coupled between the second voltage and the optocoupler, wherein the current supplied to the optocoupler is drawn through the Zener diode, and wherein the Zener diode causes the change in the level of the current to trigger the first circuit component when the second voltage falls below the second threshold level.

In some embodiments, the control circuit further includes a filtering circuit coupled between the second voltage and the Zener diode, where the filtering circuit is configured to filter out ripples on the second voltage.

In some embodiments, the power converter further includes a plurality of auxiliary output circuits, and the second output circuit is one of the plurality of output circuits.

In a second embodiment, a power supply system includes a plurality of output circuits and a control circuit. The plurality of output circuits is coupled to a magnetic element, and each of the plurality output circuits is configured to power a different one of a plurality of output loads. The plurality of output circuits includes: a first output circuit configured to generate a first voltage to power a first output load; and a second output circuit comprising a converter configured to receive an input voltage and power a second output load based on the input voltage. The control circuit is configured to trigger an increase in power supplied from the magnetic element based on a level of the input voltage.

In some embodiments, the input voltage is generated in the second output circuit before being processed by the converter.

In some embodiments, the second output circuit further comprises a capacitor coupled to an input of the converter, and the input voltage is generated across the capacitor.

In some embodiments, the capacitor is coupled to a secondary winding via a diode, and the capacitor is configured to generate the input voltage based on charge received from the secondary winding.

In some embodiments, the control circuit is configured to trigger the increase in power in response to the level of the input voltage falling below a threshold level.

In some embodiments, the control circuit includes a comparator circuit configured to generate a comparator output voltage at a level to cause a change in a level of current supplied to an optocoupler when the level of the input voltage falls below the threshold level. The optocoupler is configured to output a control signal to trigger the increase in power in response to the change in the level of current.

In some embodiments, the control circuit includes a transistor configured to supply a current to an optocoupler, and to change the level of the current when the input voltage falls below the threshold level. The optocoupler is configured to output a control signal to trigger the increase in power in response to the change in the level of current.

In some embodiments, the control circuit includes a Zener diode coupled between the input voltage and an optocoupler. The control circuit is configured to draw current through the Zener diode to the optocoupler, and the Zener diode causes a change in a level of the current when the input voltage falls below the threshold level. The optocoupler is configured to output a control signal to trigger the increase in power in response to the change in the level of the current.

In some embodiments, the control circuit further includes a filtering circuit coupled between the input voltage and the Zener diode, the filtering circuit configured to filter out ripples on the input voltage.

In some embodiments, the control circuit is further configured to monitor the first voltage, and control regulation of the first voltage based on the monitoring without being affected by changes in the level of the input voltage when the level of the input voltage is above the threshold level.

In a third embodiment, a method of controlling auxiliary bias voltage is performed. The method includes: generating, with a first output circuit of a power converter, a main output voltage to power a first load; generating, with a second output circuit of the power converter, an auxiliary voltage to power a second load; and increasing, with a magnetic element of the power converter, power supplied to the first and second output circuits in response to the auxiliary voltage falling below a threshold level.

In some embodiments, the method further includes: supplying, with a control circuit of the power converter, a current to an optocoupler; and changing, with the control circuit, a level of the current when the level of the auxiliary voltage falls below the threshold level, where increasing the power is in response to the changing of the level of the current.

In some embodiments, the method further includes: outputting, with a switching controller, a switching signal that increases an on time of a switch coupled to the magnetic element in response the auxiliary voltage falling below the threshold level.

In some embodiments, the threshold level is below a quantity based on a turns ratio between main and auxiliary secondary windings of the power converter multiplied by a main voltage generated to power a main output load.

In some embodiments, the method further includes: monitoring, with a control circuit, a level of the main output voltage; and regulating, with the control circuit, the level of the main output voltage based on the monitoring and without being affected by changes in a level of the auxiliary voltage when the level of the auxiliary voltage is above the threshold level.

Other embodiments are possible, and each of the embodiments can be used alone or together in combination. Accordingly, various embodiments will now be described with reference to the attached drawings.

DETAILED DESCRIPTION

The present description describes power converters and related methods in which feedback control circuitry causes an increase in a level of a voltage used to power auxiliary output circuitry when the level falls below a threshold level. The feedback control circuitry may cause the increase even if a bias voltage used to power main output circuitry is at a level that indicates to reduce power supplied from a magnetic element used to generate the bias voltages. The present description also describes power converters and related methods of using an input voltage instead of an output voltage of a converter of the auxiliary output circuitry to control or regulate the level of the voltage.

Figure 1:
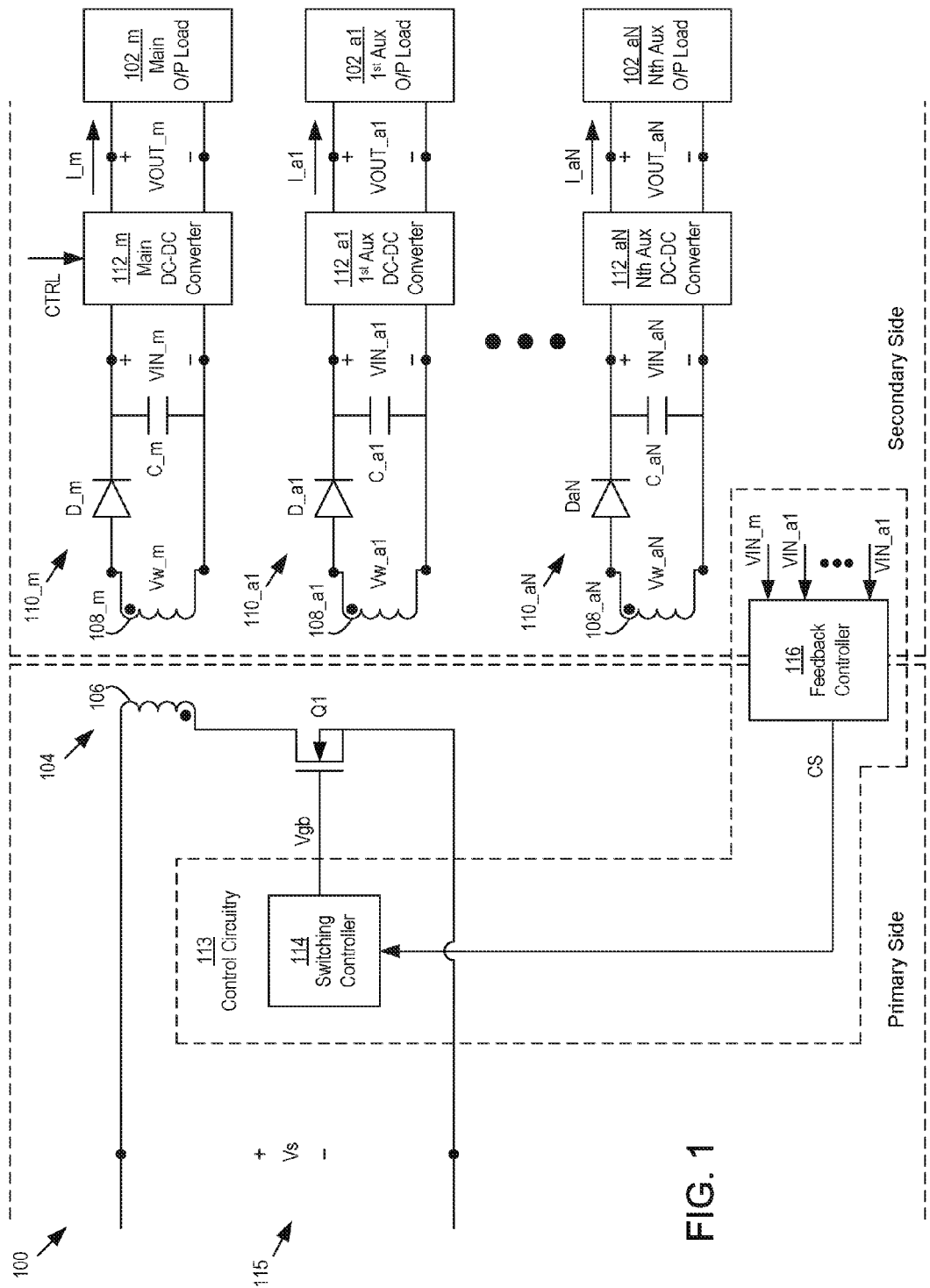
FIG. 1 shows a schematic diagram of an example switched mode power supply configured to drive multiple output loads.

FIG. 1 shows a schematic of a power converter or power supply system 100 that is configured to power a plurality of output (O/P) loads 102. The power converter 100 may be configured as a switched mode power supply in that it includes a switch Q1 that is configured to control the storage and discharge of energy in a magnetic element 104, such as a transformer. The switch Q1 may be configured as a n-channel metal-oxide-semiconductor field effect transistor (NMOS transistor), although other types of configurations for the switch Q1 may be possible.

The magnetic element 104 may include a primary winding 106 coupled to the switch Q1 and a plurality of secondary windings 108. The primary winding 106 and the switch Q1 may be configured on a primary side of the power converter 100, and the secondary windings 108 may be configured to a secondary side of the power converter 100. Energy stored in the primary winding 106 may be transferred to the plurality of secondary windings 108. The proportions of the energy transferred to the secondary windings 108 may depend on the number of turns or the turns ratios among the secondary windings 108.

The power converter 100 may further include a plurality of output circuits 110. Each output circuit 110 may be configured to power a different one of the plurality of output loads 102. In addition, each output circuit 110 may be coupled to a different one of the secondary windings 108. In the example configuration shown in FIG. 1, each output circuit 110 may include a diode D, a capacitor C, and a DC-DC converter 112. An anode end of the diode D may be connected to a first end of its respective secondary winding 108, and a cathode end of the diode D may be connected to a first end of the capacitor C. A second end of the capacitor C may be connected to a second end of the respective secondary winding 108.

An associated winding voltage Vw may be generated across each of the secondary windings 108 as a result of the storage of energy in the magnetic element 104 and the transfer of the energy from the primary winding 106 to the secondary windings 108. In order to power a load 102, when a winding voltage Vm generated across an associated secondary winding 108 is at a level that causes the diode D to be forward biased, charge stored in the secondary winding 108 is transferred to the capacitor C, which in turn causes an input voltage YIN of the associated DC-DC converter 112 to be generated across the capacitor C. The level of the input voltage VIN may depend on the amount of charge being stored in the capacitor C. To power the load 102, the DC-DC converter 112 may be configured to receive the input voltage VIN and generate and supply a current I to the output load 102 based on and/or by processing the received input voltage VIN. An output voltage VOUT may be generated across the output load 102 as a result of the current draw through the output load 102.

In some example configurations, the DC-DC converter 112 may be a step-down or buck converter in that it converts the input voltage VIN to an output voltage VOUT that is at a lower level than the level of the input voltage VIN, although other types of configurations of the DC-DC converter 112 may be possible. Additionally, the output voltage VOUT generated at the output of the DC-DC converter 112 may have a more constant voltage level compared to the level of the corresponding input voltage VIN at the input of the DC-DC converter 112, such as due to regulation performed by the DC-DC converter 112 for example. As such, for circuit components of the power converter 100 (e.g., the switching controller 114 and/or the feedback controller 116) that utilize auxiliary output circuits for a power supply or bias voltage, it may be more desirable to use an auxiliary output voltage VOUT instead of an input voltage VIN for such a power supply voltage. Also, in configurations other than the one shown in FIG. 1, some or all of the output circuits 110 may not include a DC-DC converter 112, and the voltage generated across the capacitor C is used to directly bias the output load 102.

An input 115 of the power converter 100 may be configured to receive an input source voltage Vs, which may be a direct current (DC) voltage or a rectified alternating current (AC) voltage. In some example configurations, the input 115 may be coupled to input circuitry (not shown), such as rectification circuitry (e.g., a bridge rectifier) and/or an input capacitor, which may be used to convert an AC voltage to the input source voltage Vs. The input source voltage Vs may be used to energize the magnetic element 104. That is, in operation, when the switch Q1 is turned on, energy supplied from the input 115 and based on the input source voltage Vs may be stored in the magnetic element 104. The polarities of the secondary windings 108 relative to the primary winding 106 may be such that when the switch Q1 is turned on and energy is being stored, the winding voltages Vw generated across the secondary windings 108 may be at a level (e.g., a negative level) that causes the diodes to be reverse biased. As a result, charge stored in the secondary windings 108 is not transferred to the capacitors C. Conversely, when the switch Q1 is turned off, the magnetic element 104 may not store energy supplied by the input source voltage Vs, and the polarity of the winding voltages Vw may reverse. For a given secondary winding 108 and associated output circuit 110, if enough energy is stored in the secondary winding 108, the reversed voltage Vw may be high enough to forward bias the diode D and supply stored charge to the capacitor C. The configuration of the primary and secondary windings 106, 108 and the switch Q1 corresponds to a flyback converter configuration, although other converter configurations for the primary and secondary windings 106, 108 and the switch Q1 may be possible in order to power the multiple output, loads 102.

In addition, the power converter 100 may include a controller or control circuitry 113 that includes a switching controller or control circuitry 114 and a feedback controller or control circuitry 116. The switching controller 114 may be configured to control switching of the switch Q1 by controlling whether the switch is turned on or turned off and for how long the switch is turned on and turned off. The switching controller 114 may control the switching of the switch Q1 may generating a switching signal Vgb and supplying the switching signal Vgb to the switch Q1. An example switching signal Vgb may be a pulse width modulated (PWM) signal, where a pulse of the PWM signal may be used to turn on the switch Q1. A duty cycle of the PWM signal (or a pulse width of the pulse) may determine how long the switch Q1 is turned on during a single period of the PWM signal. The switching controller 114 may be configured to determine when to output the pulses of the PWM signal and the duty cycle and/or the pulse width of the pulses of the PWM signal.

The feedback controller 116 may be configured to control the operation of the switching controller 114 by supplying a control signal CS to the switching controller 114. The control signal CS may indicate to the switching controller 114 when the switch Q1 should be turned on and turned off. In some example configurations, the control signal CS may indicate a duty cycle or pulse width of the pulses of the PWM signal. If a current duty cycle or current pulse width is different than the one indicated by the control signal CS, then the switching controller may be configured to change or adjust the current duty cycle or pulse width to the one indicated by the control signal CS. Other characteristics of the PWM signal, such as the amplitude, the period, or the frequency of the PWM signal, may be set and/or adjusted based on the control signal CS. In addition, for some example configurations, a level of the control signal CS, such as a current level or a voltage level of the control signal CS, may indicate to the switching controller 114 how to output the PWM signal, and a change in the level of the control signal CS may cause the switching controller 114 to change the output of the PWM signal accordingly.

The feedback controller 116 may generate the control signal CS based on the feedback of the input voltages VIN generated across the capacitors C of the output circuits 110. One or more levels of the input voltages VIN may indicate whether the magnetic element 104 should supply more, less, or the same amount of power to the output circuits 110. The feedback controller 116 may generate the control signal CS based on the levels of the input voltages VIN. In other example configurations, the output voltages VOUT instead of the input voltages VIN, or some combination of the input and output voltages VIN, VOUT may be fed back to the feedback controller 116. However, as previously described, the input voltage VIN may have a larger voltage swing than the corresponding output voltage VOUT, which may desirable for voltage bias requirements for one or more of the loads 102. As such, it may be more desirable to utilize one or more of the input voltages VIN across the capacitors C before processing or conversion by one or more of the DC-DC converters 112, as opposed to the output voltages VOUT supplied to the output loads 102 after processing or conversion performed by the DC-DC converters 112 for purposes of feedback control and determining the amount of power to be supplied by the magnetic element 104.

For some example configurations, the output loads 102 may be categorized into a main output load 102_*m* and an N-number of auxiliary loads 102_*a*1 to 102_*a*N, where N is an integer of one or greater. Which loads are the main loads and which loads are the auxiliary loads may depend on a type of product in which the power converter 100 is being implemented. To illustrate, for lighting products, the main output load 102_*m* may be a light source, such as one or more light emitting diodes (LEDs). The auxiliary loads 102_*a*1 to 102_*a*N may be considered accessory circuits that add to the intelligence or improve the functionality of the lighting product. As non-limiting examples, the accessory circuits may include sensors, communication circuits, microcontrollers, and/or cooling systems.

In addition or alternatively, the main output load 102_*m* and the auxiliary loads 102_*a*1 to 102_*a*N may correspond to voltage and/or power characteristics, with the main load 102_*m* receiving and/or generating an output voltage VOUT_m and/or consuming power at higher levels than the auxiliary loads 102_*a*1 to 102_*a*N. As a non-limiting example, the main output load 102_*m* may be powered using a main output voltage VOUT_m in a range of about 30-50 V and/or consume power in a range of about 20-80 Watts (W). In contrast, each of the auxiliary loads 102_*a*1 to 102_*a*N may be powered using auxiliary input and/or output voltages VIN_a1 to VIN_aN, VOUT_a1 to VIN_aN in a range of about 8-12 V and/or consume power in a range of about 3-5 W. Alternatively, one or more of the auxiliary output loads 102_*a*1 to 102_*a*N may be powered with an auxiliary output voltage VOUT_a in a range of about 3.3-5 V (i.e., lower than 8-12 V). In this case, the associated DC-DC converter 112 may be a buck or step down converter that converts an auxiliary input voltage VIN_a in the 8-12V range to an auxiliary output voltage VOUT_a in the 3.3-5 V range. These voltages and power ranges are merely exemplary and other voltage and/or power ranges may be possible. Various other ways of identifying or designating the output loads 102 as main and auxiliary may be possible.

The main output load 102_*m* may be configured to operate in a reduced power mode during which it may draw no or a relatively low amount of the main current I_m. In some example configurations, the reduced power mode may be based on user control to the power converter 100 and/or the product in which the power converter 100 is being implemented, which may result in a control signal CTRL being sent to the main DC-DC converter 112_*m*. In response, the main DC-DC converter 112_*m* may be configured to generate the main current I_m at an appropriate level for the operation of the main output load 102_*m* in the reduced power mode. To illustrate, for a lighting product where the main output load 102_*m* is a light source, the control signal CTRL input to the main DC-DC converter 112_*m* may indicate that the light source 102_*m* is to be in an off state or in a dimmed state. In turn, the main DC-DC converter 112_*m* may supply no or a relatively low amount of the main current I_m so that the light source is turned off or in its dimmed state. As a result of the little or no draw of the main current I_m, the main input voltage VIN_m across the main capacitor C_m may stay at a relatively high level even if no further energy is supplied from the main secondary winding 108_*m*.

The feedback controller 116 may be configured to monitor the main input voltage VIN_m and control regulation of the level of the main input voltage VIN_m based on the monitoring. The feedback controller 116 may control regulation of the main input voltage VIN_m by generating and outputting the control signal CS to cause an increase in power supplied from the magnetic element 104 when the feedback controller 116 detects that the level of the main input voltage VIN_m is too low, and cause a decrease in power supplied from the magnetic element 104 when the feedback controller 116 detects that the level of the main input voltage VIN_m is too high.

If the feedback controller 116 only monitors the main output circuit 110_*m*, when the main output load 102_*m* is in the reduced power mode, the feedback controller 116 may detect that the level of the main input voltage VIN_m is staying at a relatively high level, and in turn determine that the amount of power being supplied from the main secondary winding 108_*m* to the main output circuit 110_*m* can decrease. Based on the determination, the feedback controller 116 may output the control signal CS to indicate to the switching controller 114 to reduce the amount of time that the switch Q1 is turned on in order to correspondingly reduce the amount of power being supplied to the main output circuit 110_*m*.

For some applications, even if the main output load 102_*m* is in a reduced power mode, it may be desirable for one or more of the auxiliary output loads 102_*a*1 to 102_*a*N to still be operating under normal conditions and hence consuming power and drawing their respective currents I_a1 to I_aN at normal rates. To illustrate, in a lighting product, even if the main light source is turned off or in a dimmed state, it may be desirable for an auxiliary circuit, such as a sensor or a communication device, to still be operating normally.

However, if the feedback controller 116 only monitored the main input voltage VIN_m and, as a result, determined to reduce the amount of power being supplied by the magnetic element 104, the auxiliary secondary windings 108_*a*1 to 108_*a*N may not supply a sufficient amount of power to the auxiliary output circuits 110_*a*1 to 110_*a*N to maintain the auxiliary input voltages VIN_a1 to VIN_aN at sufficiently high levels so that the auxiliary DC-DC converters 112_*a*1 to 112_*a*N can generate the auxiliary output voltages VOUT_a1 to VOUT_aN and/or supply the auxiliary output currents I_a1 to I_aN at sufficient levels for the output loads 102_*a*1 to 102_*a*N to properly operate. To prevent this from happening, the feedback controller 116 may also monitor the levels of the auxiliary input voltages VIN_a1 to VIN_aN (or for other example configurations, the levels of the auxiliary output voltages VOUT_a1 to VOUT_aN, or some combination of the auxiliary input and output voltages). When one or more of the auxiliary input voltages VIN_a1 to VIN_aN falls below a threshold voltage level Vth, including during situations when the main output load 102_*m* is in its reduced power mode and/or when the main input voltage VIN_m indicates to reduce the supply of power, the feedback controller 116 may trigger or cause an increase in power supplied from the magnetic element 104, such as by outputting the control signal CS to indicate to increase the duty cycle (or on time) of the switching signal Vgb in order to increase the supply of power from the auxiliary secondary windings 108_a1 to 108_aN and, in turn, increase the auxiliary input voltages VIN_a1 to VIN_aN to be back at or above the threshold voltage level Vth.

In general, a goal of the feedback controller 116 is to control regulation of the main input voltage VIN_m, as previously described. Accordingly, it may be desirable to avoid or prevent interference of the regulation of the main input voltage VIN_m while monitoring the level of the auxiliary input voltage VIN_a1 to VIN_aN. To do so, the threshold voltage level Vth may be less than a turns ratio between the auxiliary windings 108_a1 to 108_aN and the main winding 108_m multiplied by the main input voltage VIN_m. Mathematically, the threshold voltage level Vth may be represented by the following inequality: Vth<(n2/n1)*VIN_m, where the quantity (n2/n1) represents the turns ratio between the auxiliary windings 108_a1 to 108_N and the main winding 108_m. The variable n1 represents the number of turns of the main secondary winding 108_m. For configurations where the power converter 100 includes a single auxiliary output circuit (i.e., N=1), n2 represents the number of turns of the single auxiliary winding 108_a1. For configurations where the power converter 100 includes multiple auxiliary output circuits (i.e., N>1), n2 represents a combination of the turns of the multiple auxiliary windings 108_a1 to 108_aN. When the threshold voltage level Vth is set according to the above inequality, then when the main output load 102_m is not operating (or operating in the reduced power mode), the auxiliary input voltages VIN_a1 to VIN_aN are regulated to the threshold voltage level Vth. Also, when one or more of the auxiliary input voltages VIN_a1 drops below the threshold voltage level Vth such that the feedback controller 116 triggers the switching controller 114 to output the switching signal Vgb so that more power is supplied to the output circuits 110, the winding voltage Vw_m generated across the main secondary winding 108_m will remain low enough such that the main diode D_m remains reverse biased and charge is not supplied to the main capacitor C_m. At the same time, the threshold voltage level Vth may be high enough (such as higher than a lower threshold level below the threshold voltage level Vth) so that the auxiliary input voltages VIN_a1 to VIN_aN do not fall to too low of levels to cause the auxiliary output loads 102_a1 to 102_aN to stop operating properly. Further, when the auxiliary input voltages VIN_a1 to VIN_aN are above the threshold level Vth, the control of the regulation of the main input voltage VIN_m is undisturbed or unaffected by any changes in the levels of the auxiliary input voltages VIN_a1 to VIN_aN. While the main output load 102_m is operating in its normal operating mode, the regulation of the main input voltage VIN_m may cause the levels of the auxiliary input voltage VIN_a1 to VIN_aN to be above the threshold voltage level Vth.

FIGS. 2-5 show example configurations of the feedback controller 116. Each of the configurations utilize three circuit components, including a first circuit component implemented as an optocoupler that is configured to generate the control signal CS. Each of the configurations may also include a second circuit component that monitors one or more levels of one or more of the auxiliary input voltages VIN_a1 to VIN_aN (referred to in FIGS. 2-5 as an auxiliary input voltage VIN_a), and a third circuit component that monitors the main input voltage VIN_m. The second and third circuit components may be configured to control the optocoupler in that the optocoupler may be configured to generate and output the control signal CS at a level based on the levels of the input voltages VIN monitored by the second and third circuit components. Additionally, for each of the example configurations, when the auxiliary input voltage VIN_a falls below the threshold voltage level Vth, a change in current may cause the optocoupler to generate the control signal CS to trigger an increase in power supplied from the magnetic element 104. Alternatively, when the auxiliary input voltage VIN_a is above the threshold voltage level Vth, the optocoupler may generate the control signal CS to regulate the level of the main input voltage VIN_n based on the monitoring performed by the third circuit component and without being affected or disturbed by any changes in the level of the auxiliary input voltage VIN_a.

Figure 2:
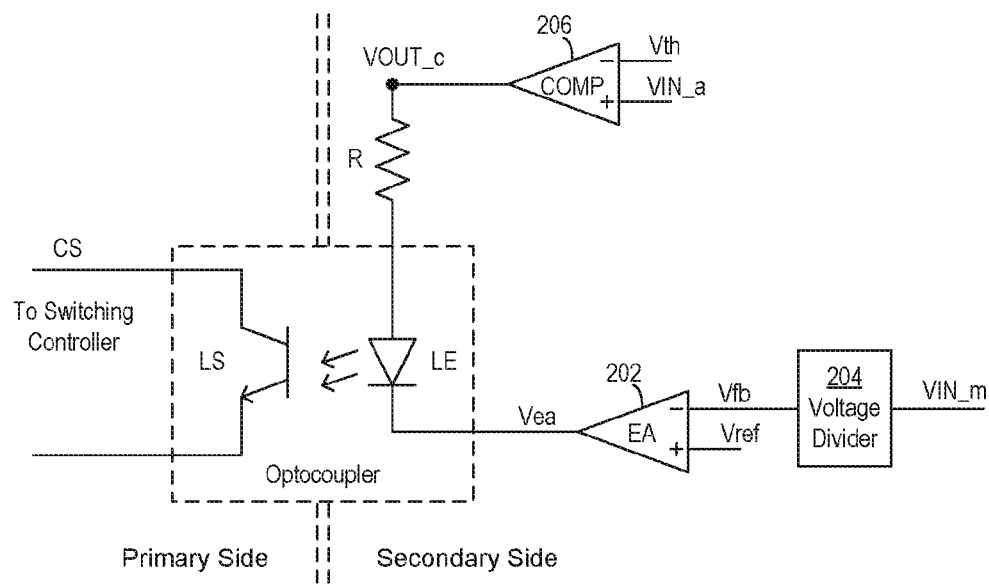
FIG. 2 shows a schematic diagram of an example configuration of a feedback controller of the switched mode power supply of FIG. 1.

Referring to FIG. 2, the optocoupler may include a light emitter (LE) and a light sensor (LS) isolated from each other. As shown in FIG. 2, the light emitter LE may be configured on the secondary side of the power converter 100 and the light sensor LS may be configured on the primary side. An example type of light emitter LE may be a LED, although other types of light emitters LE may be possible. Example types of light sensors LS may include a phototransistor, a photodiode, or a photoresistor, although other types of light sensors LS may be possible. The amount of light that the light emitter LE emits may depend on the amount of current being supplied to the light emitter LE. The light sensor US may sense the emitted light and generate the control signal CS at a level that corresponds to the amount of light it senses.

In general, when the levels of the input voltages VIN indicate that more power should be supplied from the magnetic element 104, the optocoupler may generate and output the control signal CS at a lower level, which may indicate to the switching controller 114 to increase the duty cycle or on time of the switching signal Vgb. Conversely, when the levels of the input voltage VIN indicate that less power should be supplied from the magnetic element 104, the optocoupler may generate and output the CS at a higher level, which may indicate to the switching controller 114 to decrease the duty cycle or on time of the switching signal Vgb. Since the level of the control signal CS depends on the amount of light emitted from the light emitter LE, and the amount of light emitted depends on the amount of current supplied to the light emitter LE, then a reduction in the amount of current supplied to the light emitter LE may cause an increase in the amount of power being supplied from the magnetic element 104, and an increase in the amount of current supplied to the light emitter LE may cause a decrease in the amount of power being supplied from the magnetic element 104.

For the configuration shown in FIG. 2, the third circuit component may include an error amplifier (EA) 202 that includes a negative input terminal configured to receive a feedback voltage Vfb and a positive input terminal configured to receive a reference voltage Vref. The feedback voltage Vfb may correspond to and/or be generated based on the main input voltage VIN_m. As shown in FIG. 2, a voltage divider may be included to reduce the level of main input voltage VIN_m to generate the feedback voltage Vfb. The error amplifier 202 may be configured to generate and output an error output voltage Vea based on a difference in levels between the feedback voltage Vfb and the reference voltage Vref. As shown in FIG. 2, the output of the error amplifier 202 may be connected to an end of the light emitter LE, such as a cathode end of a LED.

The main input voltage VIN_m being at a relatively low level, such as below a threshold level associated with the main input voltage VIN_m, may indicate that too little energy is being supplied from the main secondary winding 108_m and the amount of energy needs to increase in order to increase the level of the main input voltage VIN_m back up to a desired level. When the main input voltage VIN_m is at such a relatively low level, the corresponding feedback voltage Vfb is at a level that is lower than the level of the reference voltage Vref. In turn, the error amplifier 202 may generate the error output voltage Vea at a positive level in order to restrict or make more prohibitive the supply of current to the light emitter LE so that the amount of power supplied from the magnetic element 104.

Conversely, the main input voltage VIN_m being at a relatively high level, such as above a threshold level associated with the main voltage VIN_m, may indicate that the amount of energy being supplied from the main secondary winding 108_m is too high and should be decreased. When the main input voltage VIN_m is at such a relatively high level, the corresponding feedback voltage Vfb is at a level that is relatively close to or above the level of the reference voltage Vref. In turn, the error amplifier 202 may generate the error output voltage Vea at a low level, such as at or relatively close to 0 V in order to encourage an increase in the amount of current supplied to the light emitter LE.

If the feedback controller 116 was configured to monitor only the main input voltage VIN_m, the opposing end of the light emitter LE, such as the anode end, may be coupled to a constant bias voltage that is independent of or largely unaffected by changes in the auxiliary input voltages VIN_a1 to VIN_aN so that only the main input voltage VIN_m determines the amount of current supplied to the light emitter LE and, in turn, the amount of power supplied to from the magnetic element 104 to the output circuits 110. In contrast, the feedback circuit 116 includes the second circuit component to also monitor the auxiliary input voltages VIN_a1 to VIN_a2 to control the amount of current being supplied to the light emitter LE, particularly when the main input voltage VIN_m is relatively high such that the error output voltage Vea applied to cathode end of the light emitter LE is at or close to zero volts.

For the configuration shown in FIG. 2, the second circuit component may include a comparator circuit (COMP) 206 having an output coupled to the opposing end (e.g., the anode end) of the light emitter LE via a resistor R. The comparator 206 may be configured to receive an auxiliary input voltage VIN_a at a positive input terminal. For configurations where the power converter 100 includes only a single auxiliary output circuit 110_a1 (i.e., N=1), the auxiliary input voltage VIN_a may be the single auxiliary input voltage VIN_a1. Alternatively, for configurations where the power converter 100 includes multiple auxiliary output circuits 110_a1 to 110_aN (i.e., N>1), the auxiliary input voltage VIN_a may be one of or some combination of the multiple auxiliary input voltages VIN_a1 to VIN_aN.

The comparator 206 may be configured to generate a comparator output voltage VOUT_c based on a comparison of the auxiliary input voltage VIN_a and the threshold voltage level Vth. The threshold voltage Vth may be applied to a negative input terminal of the comparator 206. When the level of the auxiliary input voltage VIN_a is greater than threshold voltage level Vth, the comparator 206 may generate the comparator output voltage VOUT_c at an associated high level. Assuming that the error output voltage Vea is at or close to 0 V or otherwise sufficiently lower than the level of the comparator output voltage VOUT_c, the result of auxiliary input voltage VIN_a being higher than the threshold voltage level Vth may cause a current at an associated high level to be supplied to the light emitter LE. In turn, the light sensor LS may generate the control signal CS at an associated high level that indicates to the switching controller 114 not to increase the power supplied by the magnetic element 104. Alternatively, when the level of the auxiliary input voltage VIN_a is below the threshold voltage level Vth, the comparator 206 may generate the comparator output voltage VOUT_c at an associated low level, which may result in no or a relatively small amount of current being supplied to the light emitter LE. In turn, the light sensor LS may generate the control signal CS at an associated low level that indicates to the switching controller 114 to increase the power supplied by the magnetic element 104.

Referring both to FIGS. 1 and 2, during operation of the power converter 100, the main output load 102_m may be operating in a normal or high power mode and continuously draw the main current I_m at a certain associated high level. By monitoring the level of the main input voltage VIN_m while the main output load 102_m is operating in the high power mode, the feedback controller 116 may output the control signal CS at a level that causes the switch Q1 to continuously switch in accordance with a duty cycle that allows for the input voltages VIN to be kept at sufficiently high levels for proper operation of the output loads 102. At this time, the auxiliary input voltage VIN_a may be above the threshold voltage level Vth such that the comparator output voltage VOUT_c is at an associated high level.

Subsequently, if the main output load 102_m transitions to a reduced power mode, the main input voltage VIN_m may remain at a relatively high level, and due to the low level of the error output voltage Vea, the light sensor LS may generate the control signal CS at a level to indicate to reduce the duty cycle or on time of the switch Q1. However, the auxiliary output loads 102_a1 to 102_aN may continue to operate in their respective normal operating modes and hence continue to draw relatively high amounts of the auxiliary currents I_a1 to I_aN. With the power supplied from magnetic element 104 being reduced as a result of the main output load 102_m transitioning to the reduced power mode, the level of the auxiliary input voltage VIN_a may start to fall. When the level of the auxiliary input voltage VIN_a falls or drops below the threshold voltage level Vth, the comparator 206 may transition the level of the comparator output voltage VOUT_c from the associated high level to the associated low level. This transition from the high level to the low level may cause a corresponding drop in the level of current being supplied to the light emitter LE. The drop in the level and/or the rate at which the level of the current drops may indicate the falling of the auxiliary input voltage VIN_a below the threshold voltage level Vth. The drop in current may, in turn, trigger the optocoupler to output the control signal CS at a level to cause an increase in power supplied from the magnetic element 104. In particular, the drop in the amount of current may result in a reduced amount of light emitted by the light emitter LE, which in turn results in the light sensor LS correspondingly changing the level of the control signal CS to a level that indicates to the switching controller 114 to increase the duty cycle or on time of the switching signal Vgb.

By setting the threshold voltage level Vth to be less than (n2/n1)*VIN_m as described above, the change in the comparator output voltage VOUT_c from the high level to the low level when the auxiliary input voltage VIN_a falls below the threshold voltage level Vth will cause an increase in power so that the auxiliary input voltages VIN_a1 to VIN_aN are regulated back up to the threshold voltage level Vth but the main diode D_m is not forward biased to increase the level of the main input voltage VIN_m.

At the same time, the threshold voltage level Vth may be higher than a second threshold corresponding to a forward bias level of the light emitter LE. That is, a bias voltage applied across the light emitter LE that is below the forward bias level of the light emitter LE may cause the light sensor LS to generate the control signal CS at a level to cause an increase in supplied power. In an alternative configuration, the feedback controller 116 could let the auxiliary input voltage VIN_a decrease down to the forward bias level. However, the forward bias level may be much lower than a minimum level for the auxiliary input voltage VIN_a to be at in order to adequately power associated auxiliary load 102_a. As such, letting the auxiliary input voltage VIN_a drop down to the forward bias level may cause the associated auxiliary load 102_a to stop operating properly. Accordingly, the threshold voltage level Vth may be set high enough so that the light sensor LS generates the control signal CS at a level to cause an increase in supplied power before the auxiliary input voltage VIN_a drops too low that the associated auxiliary load 102_a is not able to operate properly. In general, the threshold voltage level Vth may be set at least as high as a minimum voltage level that ensures proper operating of the associated auxiliary load 102_a.

Figure 3:
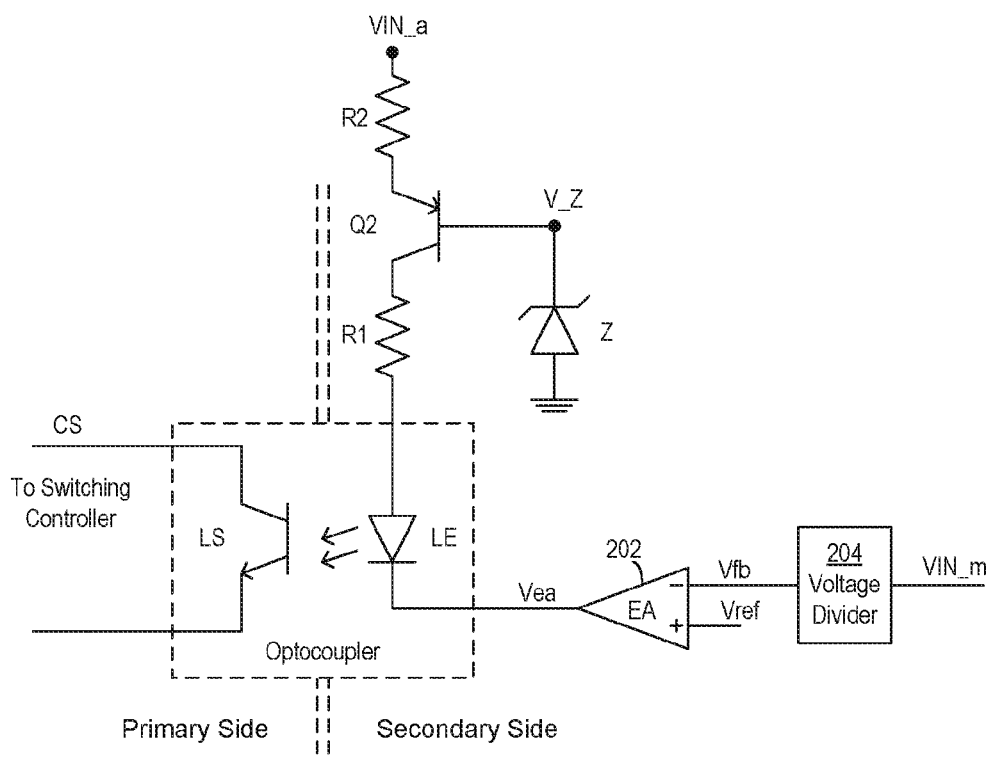
FIG. 3 shows a schematic diagram of another example configuration of the feedback controller of FIG. 1.

FIG. 3 shows another example configuration for the feedback controller 116. The configuration shown in FIG. 3 may be similar to the configuration of FIG. 2, except that instead of the comparator 206, the configuration of FIG. 3 may utilize a switch Q2 and a Zener diode Z. For some example configurations, the switch Q2 may be a PNP bipolar junction transistor, although other configurations may be possible. As a PNP transistor, the switch Q2 may include a collector terminal coupled to the opposing, anode end of the light emitter LE via a first resistor R1, an emitter terminal coupled to the auxiliary input voltage VIN_a via a second resistor R2, and a base terminal coupled to a cathode end of the Zener diode Z. Similar connections made be made for other three-terminal switches, such as a p-channel metal-oxide-semiconductor field effect transistor (PMOS transistor) having drain, source, and gate terminals. The second resistor R2 may be used to limit the current into the switch Q2 and the Zener diode Z. Additionally, the Zener diode Z may have an anode end coupled to ground. For some applications, the use of the switch Q2 and the Zener diode Z may be less costly compared to the use of the comparator 206 of FIG. 2.

For the configuration shown in FIG. 3, the threshold voltage level Vth may be equal to the sum of the emitter-to-base voltage Veb of the PNP transistor Q2 and the Zener or clamping voltage V_Z of the Zener diode Z1. When the auxiliary input voltage VIN_a is above the threshold voltage level Vth, the PNP transistor Q2 may supply a current to the light emitter LE at a level that results in the power supplied from the magnetic element 104 to not be increased. Alternatively, when the auxiliary input voltage VIN_a falls below the threshold voltage level Vth, the level of the current supplied by the PNP transistor Q2 to the light emitter LE may drop to a level and/or at a rate indicative of the auxiliary input voltage VIN_a falling below the threshold voltage level Vth. As a result of the drop, the light sensor LS of the optocoupler may correspondingly change the level of the control signal CS to indicate to the switching controller 114 to increase the duty cycle and/or on time of the switching signal Vgb.

The Zener diode Z used for the configuration of FIG. 3 may have its Zener or clamping voltage based on the turns ratio (n2/n1) between the main and auxiliary windings 108_m, 108_a1 to 108_n in accordance with threshold voltage inequality described above. In particular, the Zener or clamping voltage V_Z may be less than the turns ratio (n2/n1) multiplied by the main input voltage VIN_m, less the emitter-to-base voltage Veb of the PNP transistor Q2, which mathematically may be represented as $V\_Z<(n2/n1)*VIN\_m-Veb$.

Figure 4:
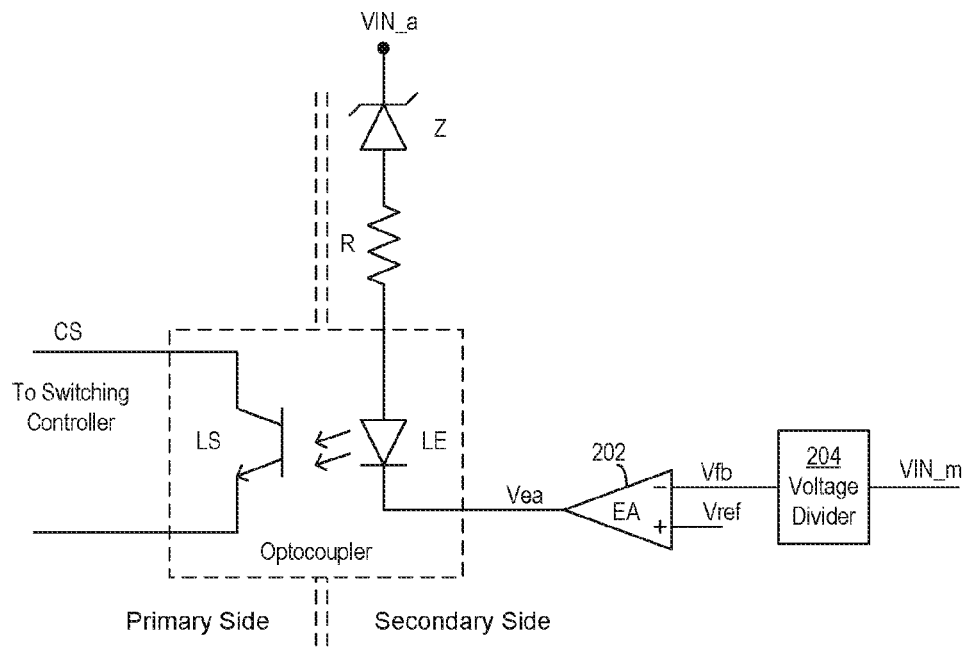
FIG. 4 shows a schematic diagram of a third example configuration of the feedback controller of FIG. 1.

FIG. 4 shows a third example configuration for the feedback controller 116. The third example configuration may be similar to the first and second configurations of FIGS. 2 and 3, except that the second circuit component includes a Zener diode Z and a resistor R coupled between the auxiliary input voltage VIN_a and the opposing, anode end of the light emitter LE. In particular, a cathode end of the Zener diode Z may be coupled to the auxiliary input voltage VIN_a, and an anode end may be coupled to the opposing, anode end of the light emitter LE via the resistor R. The threshold voltage level Vth may be equal to the Zener voltage across the Zener diode Z and the forward bias voltage of the light emitter LE.

When the auxiliary input voltage VIN_a is above the threshold voltage level Vth, the Zener diode Z may be reverse biased and supply a current to the light emitter LE via the resistor R at a level that results in the power supplied from the magnetic element 104 to not be increased. Alternatively, when the auxiliary input voltage VIN_a falls below the threshold voltage level Vth, the level of the current supplied by the Zener diode to the light emitter LE may drop to a level and/or at a rate indicative of the auxiliary input voltage VIN_a falling below the threshold voltage level Vth. As a result of the drop, the light sensor LS of the optocoupler may correspondingly change the level of the control signal CS to indicate to the switching controller 114 to increase the duty cycle and/or on time of the switching signal Vgb.

Like the Zener diode Z of FIG. 3, the Zener diode Z used for the configuration of FIG. 4 may have its Zener or clamping voltage based on the turns ratio (n2/n1) between the main and auxiliary windings 108_m, 108_a1 to 108_n in accordance with threshold voltage inequality described above. In particular, the Zener or clamping voltage V_Z may be less than the turns ratio (n2/n1) multiplied by the main input voltage VIN_m, less the forward bias voltage of the light emitter LE, which mathematically may be represented as $V\_Z<(n2/n1)*VIN\_m-V_{LE}$, where $V_{LE}$ represents the forward bias voltage of the light emitter LE.

Although the auxiliary input voltages VIN_a1 to VIN_aN may impact the level of the control signal CS to increase the supplied power when the main output load 102_m is in the reduced power mode, it may not be desirable for the auxiliary input voltages VIN_a1 to VIN_aN to disturb operation of the switching controller 114 and the switch Q1 when the main output load 102_m is in the normal or high operating mode. The auxiliary input voltages VIN_a1 to VIN_aN may not disturb the operation if they are at a sufficiently high and constant level. However, if the auxiliary input voltages VIN_a1 to VIN_aN contain a ripple, removal or sufficient reduction of the ripple may be desirable so that the ripple does not disturb operation of the power converter 100 when the main output load 102_m is operating in the normal or high power mode. An example situation or application where a ripple may occur may be where the power converter 100 operates as a power factor correction (PFC) converter 100 and the input source voltage Vs is rectified from an AC power supply, such one from a utility line or a power grid generated at 230 volts (V) and 50 Hertz (Hz) or 120 V at 60 Hz. The ripple that occurs may be a double-line frequency ripple.

Figure 5:
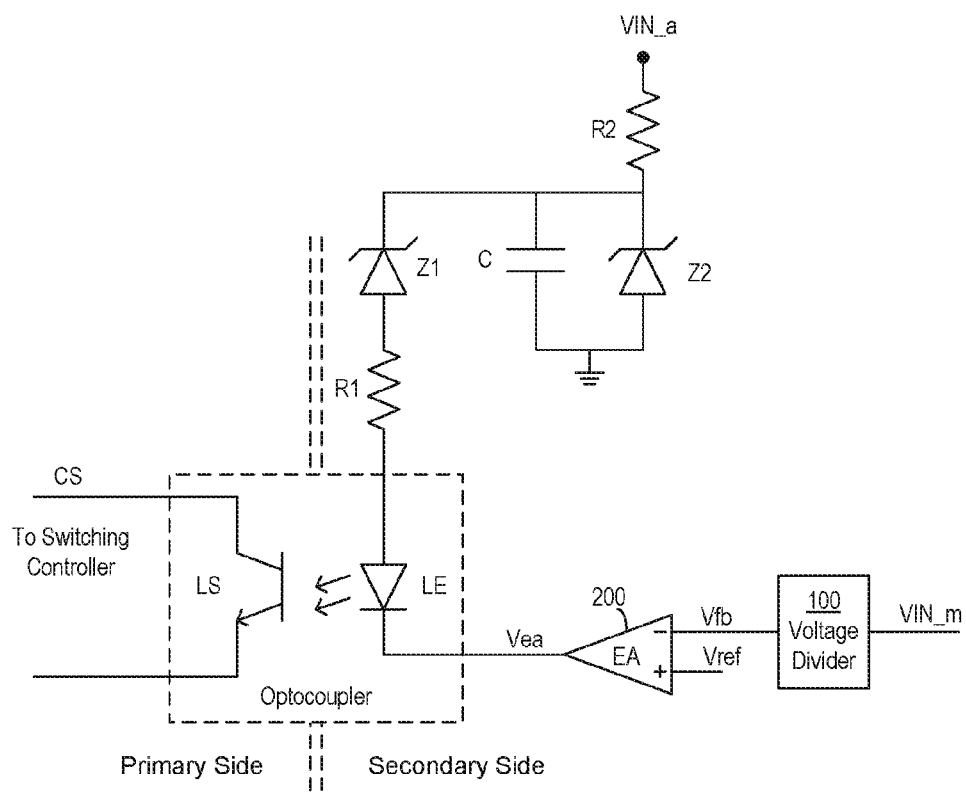
FIG. 5 shows a schematic diagram of a fourth example configuration of the feedback controller of FIG. 1.

FIG. 5 shows a fourth example configuration for the feedback controller 116 that performs filtering to remove undesirable ripples. The example configuration shown in FIG. 5 is similar to that shown in FIG. 4, except that a filtering circuit is added to the feedback controller 116 to perform filtering of the auxiliary input voltage VIN_a in order to filter out or suppress ripples on the auxiliary input voltage VIN_a. In the example configuration shown in FIG. 5, the filtering circuit includes a second Zener diode Z2 and a capacitor C to perform the filtering. As shown in FIG. 5, a first end of the capacitor C may be connected to cathode ends of a first Zener diode Z1 and the second Zener diode Z2, and a second end of the capacitor C may be connected to the anode end of the second Zener diode Z2, which are connected to ground. Like the configuration of FIG. 4, a first resistor R1 is connected between the anode end of the first Zener diode Z1 and an opposing, anode end of the light emitter LE. In addition, a second resistor R2 may be configured between the cathode ends of the first and second Zener diodes Z1, Z2 and the auxiliary input bias VIN_a to protect the first and second Zener diodes from voltage mismatch in situations where the auxiliary input voltage VIN_a is much higher than the Zener voltage of the first Zener diode Z1 and/or the second Zener diode Z2.

The Zener or clamping voltage of the second Zener diode Z2 may be lower than the level of the auxiliary input voltage VIN_a when the main output load 102_m is operating in the normal or high power mode so that the voltage across the second Zener diode Z2 is constant when the main output load 102_m is operating in the normal or high power mode. In addition, the Zener or clamping voltage of the second Zener diode Z2 may be higher than a sum of the Zener or clamping voltage of the first Zener diode Z1 and the forward bias voltage of the light emitter LE of the optocoupler. The capacitor C2 may be an optional component to help stabilize the voltage generated across the second Zener diode Z2. Other types of filtering circuits or variations of the filtering circuit shown in FIG. 5 to suppress or filter out ripples may be possible.

Like the configuration of FIG. 4, the threshold voltage level Vth for the configuration of FIG. 5 may be equal to the Zener voltage across the first Zener diode Z1 and the forward bias voltage of the light emitter LE. When the auxiliary input voltage VIN_a falls below the Zener voltage of the second Zener diode Z2, the circuit configuration of FIG. 5 may operate similar to the circuit configuration of FIG. 4. That is, when the auxiliary input voltage VIN_a is above the threshold voltage level Vth, the first Zener diode Z1 may be reverse biased and supply a current to the light emitter LE via the first resistor R1 at a level that results in the power supplied from the magnetic element 104 to not be increased. Alternatively, when the auxiliary input voltage VIN_a falls below the threshold voltage level Vth, the level of the current supplied by the first Zener diode Z1 to the light emitter LE may drop to a level and/or at a rate indicative of the auxiliary input voltage VIN_a falling below the threshold voltage level Vth. As a result of the drop, the light sensor LS of the optocoupler may correspondingly change the level of the control signal CS to indicate to the switching controller 114 to increase the duty cycle and/or on time of the switching signal Vgb.

Referring back to FIG. 1, the output loads 102 may be considered part of the power converter 100, or alternatively separate from and connected to the power converter 100. In addition, each of the output loads 102 may include one or more an active devices, one or more passive devices, or combinations thereof. In addition or alternatively, each of the output loads 102 may be configured to conduct current, maintain a substantially constant voltage, and/or function as a current sink. In addition or alternatively, each of the output loads 102 may be configured to generate energy, light, and/or emit heat. Non-limiting examples may include one or more solid state light emitters such as light emitting diodes ("LEDs"), light sources other than LEDs, cooling systems, sensors (e.g., image sensors, motion sensors, temperature sensors), communication devices (e.g., radio frequency (RF) transmitters, receivers, transceivers), controllers (e.g., microcontrollers, microprocessors), motors, gear units, resistive and/or inductive actuators, Zener diodes, linear circuitry, pulse-width-modulated (PWM) converters, resistors, capacitors, inductors, various other types of diodes, or any combination thereof. In addition or alternatively, each of the output loads 102 may include a single electronic component or circuit element, or a plurality of electronic components or circuit elements. The plurality of electronic components or circuit elements may be connected in series, in parallel, or a combination thereof. As an example illustration, an output load may include a single LED or a plurality of LEDs. The plurality of LEDs may be connected in series, in parallel, or a combination of serial and parallel connections. Various configurations of the output loads 102 may be possible.

Figure 6:
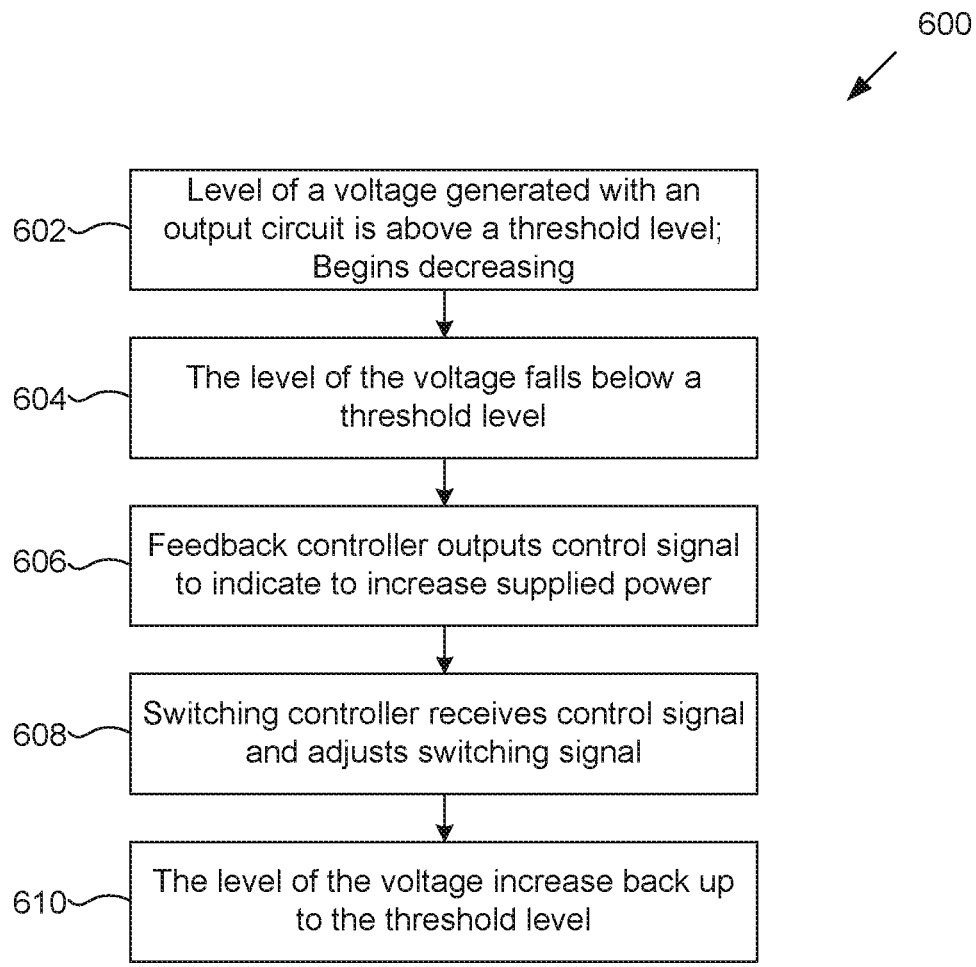
FIG. 6 shows a flow chart of an example method of increasing a voltage generated with an output circuit of a power converter that is used to power an output load.

FIG. 6 shows a flow chart of an example method 600 of increasing a voltage generated with an output circuit of a power converter that is used to power an output load. The voltage may be generated based on a winding voltage generated across a secondary winding of a magnetic element of the power converter. At block 602, a level of the voltage may be above a threshold level and begin decreasing. As previously described, the level of the voltage may be decreasing because the secondary winding is not supplying enough energy to a capacitor of the output circuit across which the voltage is generated. In some example methods, the secondary winding is not supplying enough energy because another output circuit of the power converter is generating another voltage at a high level that indicates to decrease the supply of energy to the output circuitry of the power converter. Also, in some example methods, when the voltage is above the threshold level, the power converter may monitor the level of the other voltage and regulate that level without being affected or disturbed by any changes in the level of the voltage while it is above the threshold level.

At block 604, the voltage may fall below the threshold level. At block 606, a feedback controller of the power converter may output a control signal to a switching controller that indicates to increase the power being supplied from the magnetic element. In some example methods, the feedback controller may make the indication by changing a level, such as a current level or a voltage level, of the control signal. Also, for some example methods, the feedback controller may include an optocoupler that generates the control signal and a circuit that supplies current to the optocoupler. When the voltage drops below the threshold level, the circuit may reduce the level of the current it is supplying. The drop in the level of the current and/or the rate at which the current drops may be indicative of the voltage falling below the threshold. In response to the drop in current, a light emitter of the optocoupler may emit an amount of light that causes a corresponding light sensor of the optocoupler to change the level of the control signal.

At block 608, the switching controller may receive the control signal upon the voltage falling below the threshold, and in response, adjust a switching signal that the switching controller sends to a switch coupled to a primary winding of the power converter. The switching signal may be adjusted such that an increase in power is supplied from the magnetic element to the output circuit. In some example methods, adjusting the switching signal may include increasing the duty cycle and/or on time of the switching signal. At block 610, in response to the increase in power, the level of the voltage generated with the output circuit may increase back up to the threshold level.

Figure 7:
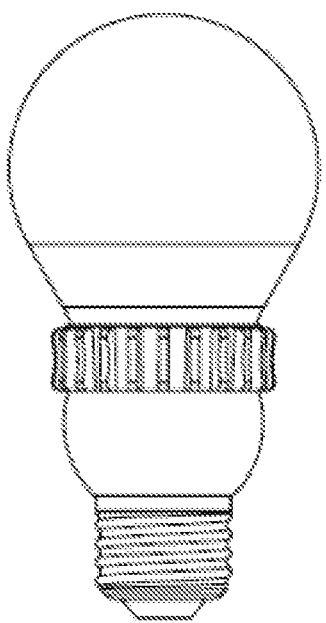
FIG. 7 shows a perspective view of an omnidirectional light bulb.
Figure 8:
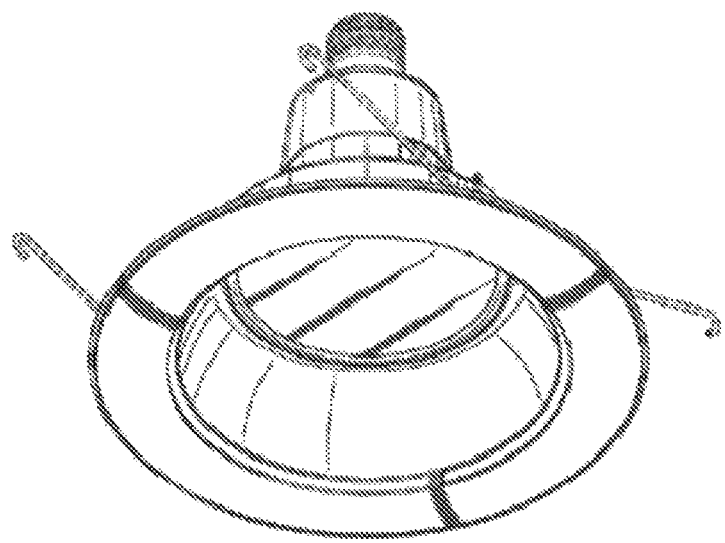
FIG. 8 shows a perspective, view of a down light.
Figure 9:
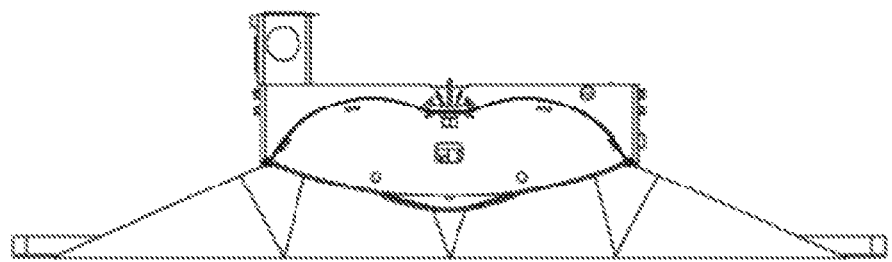
FIG. 9 shows a side view of a troffer light fixture.

Embodiments described herein have particular utility with respect to various form factor light fixtures. For example, each of the embodiments disclosed herein may be alternatively implemented in various types of solid state light fixtures including, for example, downlights, troffers, streetlights, canopy lights, parking garage lights, lights that use waveguide technology and other lighting fixtures. FIG. 7 illustrates an omnidirectional light bulb, such as an A19 bulb. Other similar consumer lights, such as PAR, BR and candelabra bulbs, can also implement the embodiments described herein. Example lights are described in U.S. Pat. Nos. 8,591,062 and 8,596,819 and U.S. patent application Ser. No. 14/306,342, each of which are incorporated herein by reference. FIG. 8 shows another downlight that can incorporate the embodiments described herein. An example of such a down light is disclosed in U.S. Pat. No. 8,777,449 incorporated herein by reference. FIG. 9 illustrates a troffer light fixture that can incorporate the embodiments described herein. An example troffer light fixture is disclosed in U.S. Published Patent Publication No. US2012/0327650, herein incorporated by reference.

Figure 10:
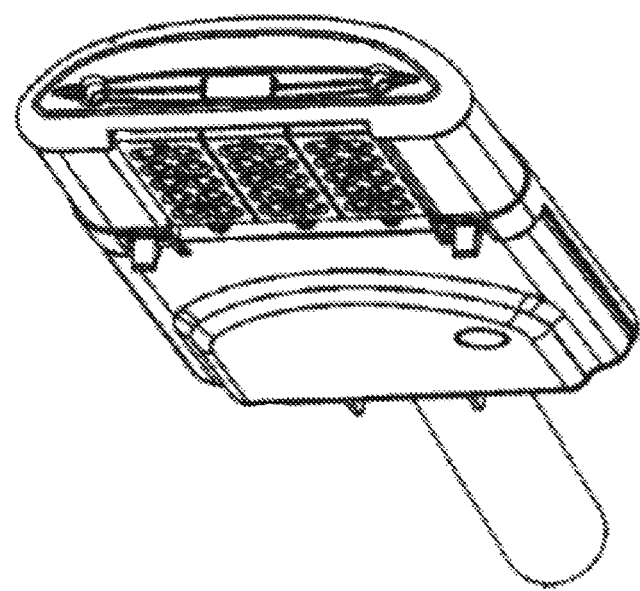
FIG. 10 shows a perspective view of solid state streetlight.
Figure 11:
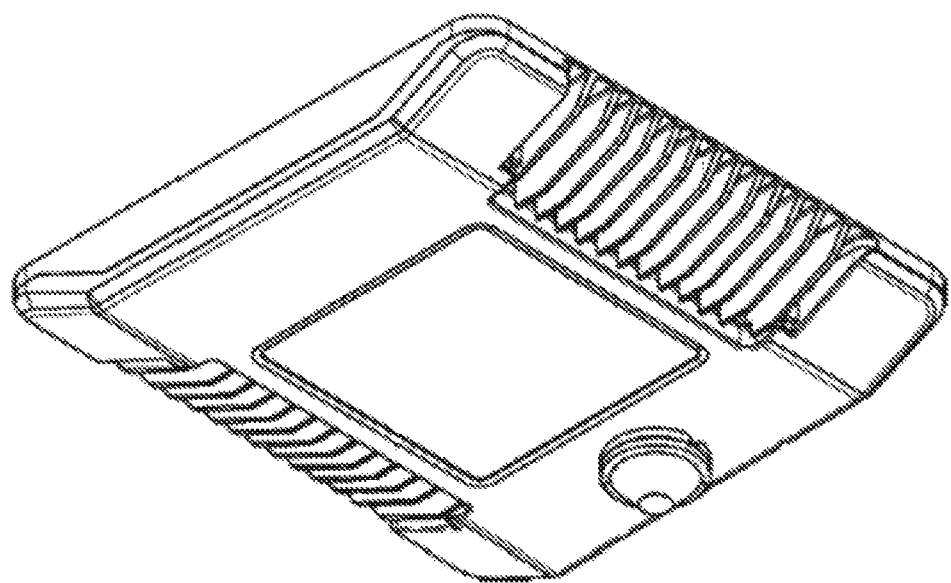
FIG. 11 shows a perspective view of a canopy light.

In another example, FIG. 10 illustrates a solid state streetlight according to further embodiments of the present invention. The streetlight may be implemented according to any of the above-described embodiments of the present invention. Other streetlights and outdoor lighting fixtures that can be implemented using the above-described embodiments of the present invention include the lights disclosed in U.S. Pat. No. 8,622,584; U.S. Pat. No. 8,425,071; U.S. Pat. No. 9,028,087; and U.S. Patent Publication No. 2015/0253488, each of which are incorporated herein by reference. Finally, FIG. 11 illustrates a canopy light according to some embodiments of the present invention. An example canopy light incorporating the embodiments described herein is described in U.S. Pat. No. 9,182,096, herein incorporated by reference. Embodiments of the present invention may also be implemented in various other lighting fixtures, such as, for example, in the waveguide-based troffers disclosed in U.S. Patent Publication No. 2014/0347885, in the troffer style fixtures disclosed in U.S. Patent Publication No. 2012/0051041 and/or in the waveguide based garage lights disclosed in U.S. Patent Publication No. 2014/0355302, each of which are incorporated herein by reference. Other and similar light fixtures can be implemented using the above-described circuitry.

The foregoing detailed description has described only a few of the many possible implementations of the present invention. For this reason, this detailed description is intended by way of illustration, and not by way of limitation.

What is claimed:

1. A power converter comprising:
    a first output circuit configured to generate a first voltage to power a first output load;
    a second output circuit configured to generate a second voltage to power a second output load; and
    a control circuit configured to:
        control power supplied from a magnetic element of the power converter to the first and second output circuits; and
        trigger an increase in the supply of power in response to a level of the second voltage falling below a threshold level.

2. The power converter of claim 1, wherein the control circuit is further configured to monitor the first voltage, and control regulation of the first voltage based on the monitoring without being affected by changes in the level of the second voltage when the level of the second voltage is above the threshold level.

3. The power converter of claim 1, wherein the control circuit is further configured to change a level of current supplied to an optocoupler in response to the level of the second voltage falling below the threshold level, wherein the change in the level of current triggers the increase in the supply of power.

4. The power converter of claim 3, wherein the control circuit comprises a comparator circuit configured to generate a comparator output voltage at a level to cause the change in the level of the current when the level of the second voltage falls below the threshold level.

5. The power converter of claim 3, wherein the control circuit comprises:
    a transistor coupled to the optocoupler, the transistor configured to supply the current to the optocoupler and change the level of the current when the second voltage falls below the threshold level.

6. The power converter of claim 5, wherein the transistor comprises a first terminal coupled to the second voltage, a second terminal coupled to a Zener diode; and a third terminal coupled to the optocoupler.

7. The power converter of claim 3, wherein the control circuit comprises a Zener diode coupled between the second voltage and the optocoupler, wherein the current supplied to the optocoupler is drawn through the Zener diode, and wherein the Zener diode causes the change in the level of the current to trigger the first circuit component when the second voltage falls below the threshold level.

8. The power converter of claim 7, wherein the control circuit further comprises a filtering circuit coupled between the second voltage and the Zener diode, the filtering circuit configured to filter out ripples on the second voltage.

9. The power converter of claim 1, further comprising:
    a plurality of auxiliary output circuits, wherein the second output circuit is one of the plurality of auxiliary output circuits.

10. A power supply system comprising:
    a plurality of output circuits coupled to a magnetic element, each of the plurality output circuits configured to power a different one of a plurality of output loads, the plurality of output circuits comprising:
        a first output circuit configured to generate a first voltage to power a first output load; and
        a second output circuit comprising a converter configured to receive an input voltage and power a second output load based on the input voltage; and
    a control circuit configured to trigger an increase in power supplied from the magnetic element based on a level of the input voltage.

11. The power supply system of claim 10, wherein the input voltage is generated in the second output circuit before being processed by the converter.

12. The power supply system of claim 10, wherein the second output circuit further comprises a capacitor coupled to an input of the converter, and wherein the input voltage is generated across the capacitor.

13. The power supply system of claim 12, wherein the capacitor is coupled to a secondary winding via a diode, and wherein the capacitor is configured to generate the input voltage based on charge received from the secondary winding.

14. The power supply system of claim 10, wherein the control circuit is configured to trigger the increase in power in response to the level of the input voltage falling below a threshold level.

15. The power supply system of claim 14, wherein the control circuit comprises a comparator circuit configured to generate a comparator output voltage at a level to cause a change in a level of current supplied to an optocoupler when the level of the input voltage falls below the threshold level, the optocoupler configured to output a control signal to trigger the increase in power in response to the change in the level of current.

16. The power supply system of claim 14, wherein the control circuit comprises a transistor configured to supply a current to an optocoupler, and to change the level of the current when the input voltage falls below the threshold level, the optocoupler configured to output a control signal to trigger the increase in power in response to the change in the level of current.

17. The power supply system of claim 16, wherein the transistor comprises a first terminal coupled to the input voltage, a second terminal coupled to a Zener diode; and a third terminal coupled to the optocoupler.

18. The power supply system of claim 14, wherein the control circuit comprises a Zener diode coupled between the input voltage and an optocoupler, wherein the control circuit is configured to draw current through the Zener diode to the optocoupler, and wherein the Zener diode causes a change in a level of the current when the input voltage falls below the threshold level, the optocoupler configured to output a control signal to trigger the increase in power in response to the change in the level of the current.

19. The power supply system of claim 18, wherein the control circuit further comprises a filtering circuit coupled between the input voltage and the Zener diode, the filtering circuit configured to filter out ripples on the input voltage.

20. The power supply system of claim 14, wherein the control circuit is further configured to monitor the first voltage, and control regulation of the first voltage based on the monitoring without being affected by changes in the level of the input voltage when the level of the input voltage is above the threshold level.

21. A method of controlling auxiliary bias voltage, the method comprising:
  generating, with a first output circuit of a power converter, a main output voltage to power a first load;
  generating, with a second output circuit of the power converter, an auxiliary voltage to power a second load; and
  increasing, with a magnetic element of the power converter, power supplied to the first and second output circuits in response to a level of the auxiliary voltage falling below a threshold level.

22. The method of claim 21, further comprising:
  supplying, with a control circuit of the power converter, a current to an optocoupler; and
  changing, with the control circuit, a level of the current when the level of the auxiliary voltage falls below the threshold level, wherein increasing the power is in response to the changing of the level of the current.

23. The method of claim 21, further comprising:
  outputting, with a switching controller, a switching signal that increases an on time of a switch coupled to the magnetic element in response the level of the auxiliary voltage falling below the threshold level.

24. The method of claim 21, wherein the threshold level is below a quantity based on a turns ratio between main and auxiliary secondary windings of the power converter multiplied by a main voltage generated to power a main output load.

25. The method of claim 21, further comprising:
  monitoring, with a control circuit, a level of the main output voltage; and
  regulating, with the control circuit, the level of the main output voltage based on the monitoring and without being affected by changes in a level of the auxiliary voltage when the level of the auxiliary voltage is above the threshold level.

* * * * *